United States Patent
Chen et al.

(10) Patent No.: US 10,391,425 B2
(45) Date of Patent: Aug. 27, 2019

(54) FLUIDIC DEVICE AND DEGASSING METHOD

(71) Applicant: Siemens Healthcare Diagnostics Inc., Tarrytown, NY (US)

(72) Inventors: Dafeng Chen, Sharon, MA (US); James E. Rasmussen, Plainville, MA (US); Manish Deshpande, Canton, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 15/318,898

(22) PCT Filed: Jun. 16, 2015

(86) PCT No.: PCT/US2015/035988
§ 371 (c)(1),
(2) Date: Dec. 14, 2016

(87) PCT Pub. No.: WO2015/195636
PCT Pub. Date: Dec. 23, 2015

(65) Prior Publication Data
US 2017/0120164 A1 May 4, 2017

Related U.S. Application Data

(60) Provisional application No. 62/012,577, filed on Jun. 16, 2014.

(51) Int. Cl.
*B01D 53/22* (2006.01)
*B01D 19/00* (2006.01)

(52) U.S. Cl.
CPC ..... *B01D 19/0031* (2013.01); *B01D 19/0063* (2013.01)

(58) Field of Classification Search
CPC .............. B01D 63/06; B01D 2313/243; B01D 19/0005; B01D 19/0031; B01D 19/0063;
(Continued)

(56) References Cited

U.S. PATENT DOCUMENTS 3,242,643 A * 3/1966 Moore ............... B01D 19/0036
95/249
4,960,706 A * 10/1990 Bliem ................. B01F 3/04106
261/122.1
(Continued)

FOREIGN PATENT DOCUMENTS

EP    1304388 A    4/2003
EP    2062644 A1   5/2009

OTHER PUBLICATIONS

International Search Report and Written Opinion of International Application No. PCT/US2015/035988 dated Sep. 14, 2015.
(Continued)

*Primary Examiner* — Anthony R Shumate
(74) *Attorney, Agent, or Firm* — Kyle D. Petaja

(57) ABSTRACT

A fluidic device and a method for degassing a fluidic device are presented. The fluidic device includes a plurality of fluidic components such as channels, chambers, and integrated valves and pumps, etc. A porous membrane is disposed on a degassing area of the fluidic device for removing gas (such as, for example, bubbles) contained in a liquid. A fluid control device monitors a pressure profile indicating a pressure in the fluidic device over time and applies a pressure differential between two sides of the membrane when activated. The membrane is permeable to gas in the fluidic device and is impermeable to liquids through the pores under the pressure differential. The disclosed method enables degassing large volume of gas at a high flow rate and provides a bubble free filling in a fluidic device which is
(Continued)

critical to precision sample metering, mixing, fluid control, reaction, and detection, etc.

9 Claims, 2 Drawing Sheets

(58) Field of Classification Search
CPC .......... B01D 2313/125; B01D 2313/16; B01D 61/362
See application file for complete search history.

(56) References Cited

U.S. PATENT DOCUMENTS

| | | | | |
|---|---|---|---|---|
| 6,142,748 A * | 11/2000 | Harris | ............ | F04D 9/04 165/104.27 |
| 6,241,945 B1 * | 6/2001 | Owen | ............ | A61M 1/1698 210/252 |
| 6,248,157 B1 * | 6/2001 | Sims | ............ | B01D 19/0031 95/46 |
| 6,485,450 B1 * | 11/2002 | Owen | ............ | A01N 1/02 128/898 |
| 6,673,594 B1 * | 1/2004 | Owen | ............ | A01N 1/02 435/284.1 |
| 8,668,763 B2 | 3/2014 | Gerner | | |
| 2003/0164297 A1 * | 9/2003 | Day | ............ | G01N 27/44747 204/469 |
| 2004/0058432 A1 * | 3/2004 | Owen | ............ | A01N 1/02 435/284.1 |
| 2004/0224298 A1 * | 11/2004 | Brassil | ............ | A01N 1/02 435/1.1 |
| 2005/0221269 A1 * | 10/2005 | Taylor | ............ | A01N 1/02 435/1.1 |
| 2008/0078699 A1 * | 4/2008 | Carr | ............ | E21B 21/065 209/233 |
| 2008/0142441 A1 * | 6/2008 | Pashley | ............ | B01D 19/0031 210/640 |
| 2012/0198921 A1 | 8/2012 | Lundgreen et al. | | |
| 2012/0245042 A1 | 9/2012 | Liu et al. | | |
| 2013/0061748 A1 * | 3/2013 | Sims | ............ | B01D 19/0031 95/46 |
| 2013/0112080 A1 * | 5/2013 | Piper | ............ | B01D 19/0068 96/155 |
| 2013/0267896 A1 | 10/2013 | Dogwiler et al. | | |
| 2014/0216250 A1 | 8/2014 | Meyer et al. | | |
| 2016/0175740 A1 * | 6/2016 | Stark | ............ | F25B 43/04 95/22 |
| 2016/0185504 A1 * | 6/2016 | Ito | ............ | B65D 81/263 383/103 |

OTHER PUBLICATIONS

Sterlitech Corporation "General Filtration FAQ", <https://www.sterlitech.com/faqs/general-filtration> (last accessed Jun. 15, 2015), p. 1.

Sterlitech Corporation "PTFE Laminated Membrane Filters", <https://www.sterlitech.com/ptfe-laminated-membrane-filters.html> (last accessed Jun. 15, 2015), p. 1.

European Search Report and Written Opinion of European Application No. 15809808.7 dated May 22, 2017.

* cited by examiner

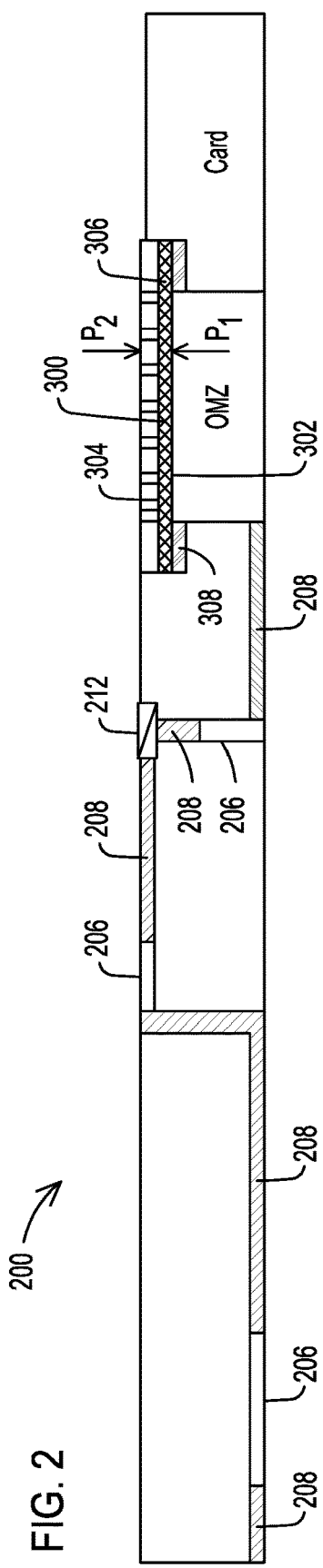
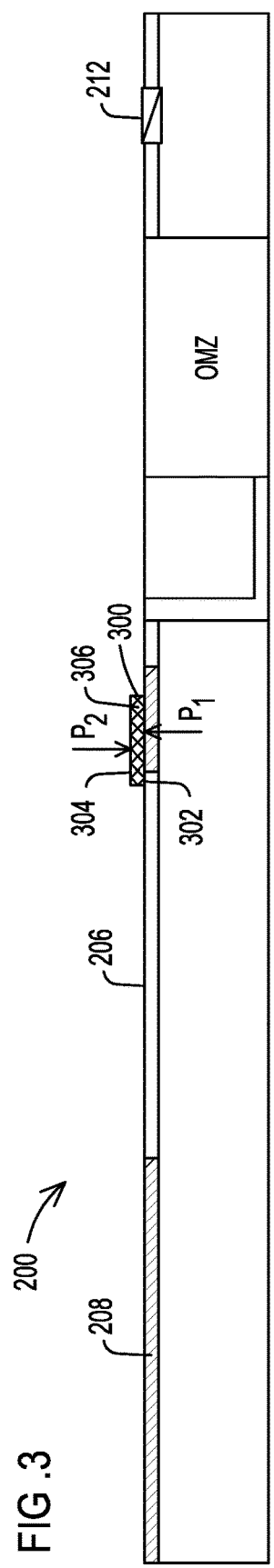

FLUIDIC DEVICE AND DEGASSING METHOD

FLUIDIC DEVICE AND DEGASSING METHOD

The subject application claims benefit under 35 USC § 119(e) of U.S. Provisional Application No. 62/012,577, filed Jun. 16, 2014. The entire contents of the above-referenced patent application are hereby expressly incorporated herein by reference.

FIELD

Aspects of the present invention relate to a fluidic device, and in particular, to techniques for degassing a fluidic device.

DESCRIPTION OF RELATED ART

A fluid system, in general, may comprise a fluidic device that operates by the interaction of streams of fluid. In recent years, miniature fluidic devices, such as microfluidic devices and biochips, have attracted more and more attention, for example, in the field for point-of-care testing. Miniaturization is a trend of medical devices in this field. A fluidic device in this field usually provides integration of multiple analytical steps into a single device. A fluidic device may perform one or more assays. For the purposes of the instant disclosure, an assay may be defined as a procedure for quantifying the amount or the functional activity of an analyte in a liquid sample. A typical on-chip assay may involve a variety of on-board operations, such as sample introduction and preparation, metering, sample/reagent mixing, liquid transport, and detection, etc. These operations may result in gas inside the fluidic device.

In many cases, gas in a sample and reagents interferes with the performance of an assay as well as the fluid control of the fluidic device. For example, bubbles inside the fluidic device may result in metering inaccuracy, fluid segmentations, inefficient mixing, detection scattering, and fluid control inconsistence, among other issues. The need to remove the gas in sample/reagents is of importance to the performance of the fluidic device.

However, many of the fluidic devices, such as microfluidic devices, are closed systems that are composed of sealed channels and chambers. Bubbles trapped in these devices may be randomly distributed and less accessible, whereby bubble management is challenging.

Presently, gas contained in the fluidic device are removed, for example, with micro fabricated structures in the fluidic devices that function as bubble traps. Such configurations are much less feasible, more expensive, and may induce sample loss. Moreover, such configurations are less versatile and allow low flow rate. Most alternatives are not amenable to mass production and they may not be able to handle large amount of bubbles on card.

SUMMARY

Briefly described, aspects of the present invention relate to a fluidic device, and in particular, to techniques for degassing a fluidic device.

According to a first aspect, a fluidic system comprises a fluidic device in which one or more degassing membranes reside, and a fluid control device. The fluidic device comprises a plurality of fluidic components including, but not limited to, channels, chambers, and integrated valves and pumps, etc. The fluid control device is connected to the fluidic device for controlling a flow of the liquid inside the fluidic device. The fluid control device is operated to remove gas and bubbles contained in the liquid.

The one or more porous degassing membranes are disposed at degassing areas of the fluidic device. The fluid control device generates a positive pressure differential between two sides of the membrane when activated. At a proper pressure differential, the membrane is permeable to the gas contained in the liquid through the pores and is impermeable to the liquid in the fluidic device.

According to a second aspect, a method for degassing a fluid device comprising a fluidic device comprises disposing a porous membrane at a degassing area of the fluidic device for removing gas or bubbles contained in the fluidic device. The membrane comprises a plurality of pores. One side of the membrane faces the liquid. The method further comprises generating a controlled pressure differential between two sides of the membrane when activating a fluid control device. The membrane is permeable to the gas or bubbles contained in the fluidic device and is impermeable to the liquid in the fluidic device below a given pressure differential. The method further comprises applying said pressure differential to the membrane till the gas or bubbles contained in the fluidic device are substantially removed from the fluidic device.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings:

FIG. 2 illustrates a cross-sectional view of a fluidic device according to an exemplary embodiment of the present invention;

FIG. 3 illustrates a cross-sectional view of a fluidic device according to another exemplary embodiment of the present invention.

DETAILED DESCRIPTION OF INVENTION

Figure 1:
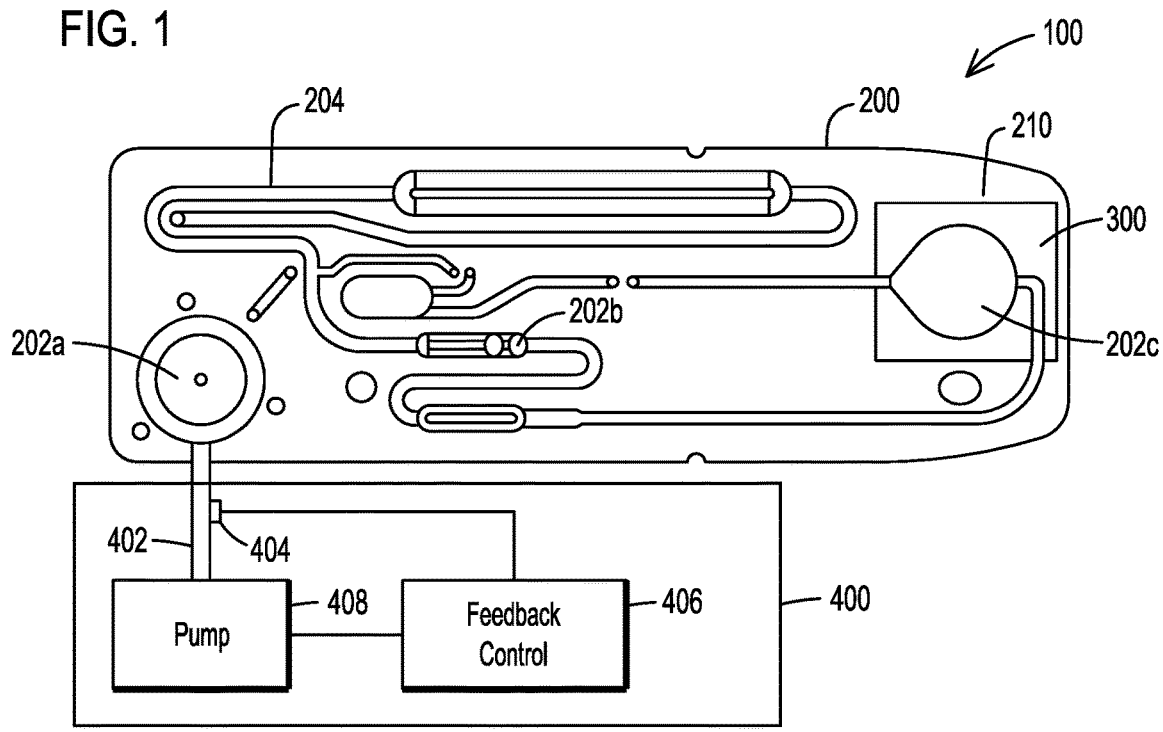
FIG. 1 illustrates a top view of a fluid system according to an exemplary embodiment of the present invention.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, settling or precipitation of cells or particles out of suspension or solution, chemical or biological degradation of solutions over time, stress exerted on structures, and combinations thereof, for example.

As used herein, the terms "fluid," "fluid sample", or "sample," and variations thereof, are intended to a portion of a fluid. Non limiting examples include biological fluids, chemical fluids, chemical substances, suspensions, solutions, slurries, mixtures, agglomerations, tinctures, or other preparations of fluids, synthetic analogs to fluids, reagents, whole blood, urine, and combinations thereof, for example.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present). An inclusive or may be understood as being the equivalent to: at least one of condition A or B.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

A detailed description related to aspects of the present invention is described hereafter with respect to the accompanying figures.

FIG. 1 illustrates a top view of a fluid system 100 according to an exemplary embodiment of the present invention. FIGS. 2 and 3 illustrate additional cross-sectional view of fluidic device 400 and 500, respectively, according to other exemplary embodiment of the present invention. As illustrated in FIG. 1, the fluid system 100 comprises a fluidic device 200 through which a fluid is transported, and a fluid control device 400. In one embodiment, the fluidic device 200 may be a microfluidic device or a biochip for the performance of one or more assays.

As illustrated in FIG. 1, the fluidic device 200 comprises at least one fluidic chamber 202a-c and one or more fluidic channels 204 that are connected to the at least one fluidic chamber 202a-c. According to an exemplary embodiment, the fluidic channel 204 may be a closed channel.

In the illustrated embodiment, at least one fluidic chamber 202a-c comprises a sample metering chamber 202a, a reaction chamber 202b and an optical measurement chamber 202c which is in an optical measurement zone (OMZ). The embodiment shown in FIG. 1 is illustrative. Alternate embodiments may include greater or lesser numbers of the same or different types of fluidic chambers.

Embodiments described herein provide a novel technique of degassing a fluidic device by way of the inventive porous membranes 300 which are disposed at one or more degassing areas in the fluidic device. As used in this description, the term "degassing" generally refers to a method for removing gas from within the fluidic device. The degassing area could be located at any one location or at multiple locations in the fluidic device, including one or more of the fluidic channels or one or more of the fluidic chambers. In the embodiment depicted in FIG. 1, the porous membrane 300 is positioned above the chamber 202c.

The term gas, as used in this disclosure, refers to the following non-limiting examples of gas in the fluidic device: gas bubbles present in the liquid sample upon introduction to the fluidic device; gas bubbles which form in the liquid sample while contained inside the fluidic device; gas trapped in fluidic channels or fluidic chambers during fluid transport or filling of the fluidic device; and areas of gas trapped between two areas liquids in the fluidic device. Additionally, the commonly used T-junction type of fluidic device may also induce bubbles. For avoidance of doubt, gas should be understood as including bubbles.

The illustrated membrane 300 is porous, i.e., comprising a plurality of pores 306. A first side 302 of the membrane 300 faces the interior of the fluid device 200 (and the liquid 208 that may be present therein) while a second side 304 of the membrane 300 faces the exterior of the device. The plurality of pores 306 are located throughout the membrane 300 and, when take as a group, form a series of three dimensional interlinked channels that allow gas 206 to move from the first side 302, through the membrane 300, and out the second side 304. The pores 306 may have a substantially uniform size or may vary in size. The first side 302 and the second side 304 may be disposed a distance apart and parallel to one another (as depicted in FIGS. 1-3). However it should be appreciated that the first side 302 and the second side 304 may be disposed at a wide variety of distances from one another and at variety of angles from one another (including perpendicular).

According to various illustrative embodiments, when a sufficient pressure differential is present between the first side 302 and the second side 304, the membrane 300 is permeable to gas but impermeable to liquid. As should be understood, the precise pressure differential required for gas or bubbles to penetrate the membrane depends on the material used to construct the membrane 300 and the type of liquid used in the fluid device. In an illustrative embodiment, gas can penetrate the membrane when the pressure against the first side 302 is higher than the pressure against the second side 304. However, when the pressure difference against the second side 304 is too high as compared to the pressure against the first side 302, no gas or bubbles will penetrate the membrane. Conversely, if the pressure against the first side 302 is too high as compared to the second side 304, the liquid from within the fluid device 200 could be forced through the membrane 300 pores along with the gas (which could rupture the membrane).

According to an exemplary embodiment, the membrane 300 may be formed of materials including, but not limited to, polymers such as polytetrafluoroethylene (PTFE), polyvinylidene fluoride (PVDF), unsaturated polyester (UPE), polycarbonate (PC), and polypropylene (PP), etc. In various illustrative embodiments, the porous membrane exhibits hydrophobic behavior under normal conditions. The hydrophobicity of the membrane facilitates separation of gas or bubbles from the liquid under the applied pressure differential.

As illustrated in FIG. 1, the membrane 300 is positioned at a degassing area 210 in the fluidic device 200, which, in this embodiment, is disposed above the optical measurement chamber 202c when the fluid device 200 is viewed from above (as in FIG. 1). Further embodiments may include a plurality of membranes that are disposed at a plurality of degassing areas in the fluidic device 200.

The pores of each individual membrane may be differently dimensioned. The dimensions of the pores influence a pressure profile in the fluidic device, which refers to pressure characteristics over time in the fluidic device. The pressure profile of a specific device is dependent on a number of factors including the flow rate, membrane properties, membrane thickness and pore sizes, and fluid properties. Generally speaking, the average size of the pores of a membrane 300 has an inverse relationship with the internal pressure needed within the fluidic device 200 to force gas, but not liquid, through the membrane. The individual membrane may be designed to with pore dimensions and thickness optimizes for a predefined operating pressure or pressure range in the fluidic device. According to an embodiment, the pore size may be in a range of 1 um to 20 um. According to an embodiment, the pressure may be in a range of 0 psi to 10 psi. For example, for a 10 um pore size membrane, with a pressure in a range of 0 psi to 5 psi, a degassing flow rate may go up to 50 ul/s. In an example, for a 10 um pore size membrane, the flow rate may be 20 ul/s.

According to an exemplary embodiment, the membrane 300 may be disposed at any locations along the fluidic device 200 where bubble-free filling is critical for metering, mixing, fluid control, reaction, and detection. For example and without limitations, the membrane 300 may be disposed on at least one fluidic channel 204 or may be disposed over at least one of the fluidic chamber 202a-c.

The pressure in the fluidic device 200 is controlled by the fluid control device 400 which is connected to the fluidic device 200. The fluid control device 400 is connected to a point in the fluidic device 200 via a connecting element 402. In further embodiments, a plurality of fluid control devices may be connected to different points in the fluidic device 200. In still further embodiments, a single fluid control device may be connected to the fluidic device 200 via a plurality of connecting elements at a plurality of different locations in the fluidic device 200.

According to an exemplary embodiment illustrated in FIG. 1, the fluid control device 400 may comprises a pump 408, a pressure sensor 404, and a feedback control 406. The pump 400, for example, may be a syringe pump, a peristaltic pump, a piezoelectric pump, or the like, which provides a required flow rate. The connecting element 402 for connecting the fluid control device 400 to the fluidic device 200 may be a tube or hose. As understood by one skilled in the art, additional fluid control elements, such as built-in or external valves 212, may be arranged at different points in the fluidic device 200 based on the specific assay to be performed. The discussion of such elements is omitted herein.

As illustrated in FIG. 1, the pressure sensor 404 monitors a pressure profile in the fluidic device 200. In the illustrated embodiment the pressure sensor 404 is disposed at the connecting element 402. The pressure sensor 404 may alternately be disposed at a location internally within the fluidic device 200. For example, the pressure sensor may be disposed at ports in the fluidic device, such as sample port, gas vents, etc. A pressure sensor may be construed to be a device or collection of devices that are capable of directly or indirectly measuring a pressure in the fluidic device 200. The pressure variation measured by the pressure sensor may be correlated with the pressure difference between the two sides of the membrane 300.

As illustrated in FIG. 1, the fluid control device 400 may comprise a feedback control 406. The pressure sensor 404 may be connected to the feedback control 406 via a connection, which may include a wire connection or a wireless connection. The feedback control 406 may comprise a controller, such as a proportional integral-derivative (PID) controller or programmable logic controller (PLC), among others.

FIG. 2 illustrates a cross-sectional view of a fluidic device 400 according to an exemplary embodiment of the present invention. As illustrated in FIG. 2, the fluidic device 400 resembles fluid device 200 and comprises a fluidic chamber 202 and a fluidic channel 204 which allows fluid 208 to flow through the fluid device 400 to the fluidic chamber 202c. According to an exemplary embodiment, areas of gas 206 may be present in in fluidic channel 204 in-between areas of liquid 208. While not depicted in FIG. 2, it should be understood that gas 206 bubbles may also be present in the liquid 208. Liquid 208B in FIG. 2 represents a second type of liquid in fluid channel 204 that is different from liquid 208 and is separated by a segment of gas 206.

As illustrated in FIG. 2, a membrane 300 is disposed at a degassing area 210, which is disposed over a fluidic chamber 202c of the fluidic device 400. For example, the degassing area 210 is disposed over an optical measurement chamber 202c in an optical measurement zone where is the presence of gas is undesirable. Alternative embodiments include the membrane 300 disposed over one or more, up to all, of the sample metering chamber 202a or reaction chamber 202b. According to the exemplary embodiment depicted in FIG. 2, interior facing first side 302 of the membrane 300 faces the optical measurement chamber 202c thus allowing any gas 206 or bubbles in the optical measurement chamber 202c to escape through the membrane 300. Thus, while not depicted in FIG. 2, as liquid 208 or 208B fills the optical measurement chamber 202c gas 206 or bubbles are forced out through the membrane 300. As shown in FIG. 2, a support member 310 may also be positioned over the top of membrane 300. The support member 310 may be position so as to help hold the membrane 300 in place. The support member 310 may be made from any suitable material and configured to allow gas to move freely through it. For example, the porous support member 310 may be porous or have holes extending there through such that gas to move from the optical measurement chamber 202c, through the membrane and then through the support member 310.

FIG. 3 illustrates a cross-sectional view of a fluidic device 500 according to another exemplary embodiment of the present invention. As illustrated in FIG. 3, a membrane 300 is disposed at a degassing area 210 above a fluidic channel 204 of the fluidic device 500, which is located upstream of the optical measurement chamber 202c. Accordingly, gas or bubbles may escape through the membrane 300 in fluidic device 500 before reaching the optical measurement chamber 202c. Thus, while not depicted in FIG. 3, as liquid 208 fills the optical measurement chamber 202c gas 206 or bubbles are forced out through the membrane 300.

According to an exemplary embodiment, the membrane 300 is attached to the any one of fluidic devices 200, 400, and 500 by way of an attachment mechanism 308. As illustrated in FIG. 2, the membrane 300 is attached to the device 200 at the first side 302 by a bonding agent 308. The membrane 300 may be attached to the fluidic device 200 by other bonding mechanisms 308, for example, but not limited to, adhesives, thermal bonding or ultrasonic bonding.

In FIGS. 2 and 3, the pressure acting on the first side 302 of the membrane 300 is indicated as P1, while the pressure acting on the second side 304 of the membrane 300 is indicated as P2. The pressure difference (P1−P2) between the two sides 302, 304 of the membrane 300 is controlled by, in certain illustrative embodiments, the one or more fluid control device 400 such that the pressure acting on the first side 302 (P1) exceeds the pressure acting on the second side 304 (P1>P2). Under application of a positive pressure difference between the first side 302 and the second side 304 of the membrane 300 (i.e., where P1−P2 is greater than zero), there is a tendency of the liquid 208 along with the gas 206 to push against the first side 302 of the membrane 300. However, it has been found it takes a relatively low positive pressure differential to expel the gas 206 through the pores 306 of the membrane 300 as compared to the high positive pressure differential it takes for the liquid 208 to flow out through the pores 306 of the membrane 300.

A threshold pressure differential refers to the highest positive pressure differential that, when applied across the two sides 302, 304 of the membrane 300, is sufficient to allows gas 206 to flow through the pores 306 of the membrane 300 but not the liquid 208. The threshold pressure differential is a function of several different factors, such as, but not limited to, the distance between the two sides 302, 304 of the membrane 300, the type of liquid 208, the configuration of the fluid device, and the characteristics of the membrane itself. In one embodiment, membrane 300 is made of a hydrophobic material, which requires a higher pressure differential (P1−P2), as compared to a non-hydrophobic membrane 300, to be applied to the membrane 300 in order for the liquid 208 to flow through the pores 306 of the membrane 300. Using a hydrophobic membrane thus allows the one or more fluid control devices 400 to operate at a higher pressure, whereby a higher flow rate may be established in any one of fluidic devices 200, 400, and 500. The threshold pressure differential may be also be impacted by reducing/increasing the pore size of the membrane 300 or increasing/decreasing the distance between the two sides 302, 304.

In certain embodiments discussed herein, the one or more fluid control devices 400 are arranged to apply a positive pressure P1 on the first side 302 of the membrane 300, while second side 304 of the membrane 300 may be exposed to an ambient pressure P2. Alternatively, instead of applying a positive pressure P1 on the first side 302 of the membrane 300, a negative pressure P2 may be applied to second side 304 of the membrane 300, for example, by way of a vacuum pump connected to the second side 304 of the membrane to achieve a sufficient pressure differential for gas 206, but not liquid 208, to flow through membrane 300. In a further embodiment, a combination of the above may be applied. An underlying feature of the mentioned embodiments is to ensure that P1>P2, and that the differential pressure across the membrane (P1−P2) is below the applicable threshold value to prevent the liquid 208 flowing through the pores 306.

An illustrative degassing method is based on applying a sufficiently low pressure differential between the two sides 302, 304 of the membrane 300 (P1−P2) until the gas or bubbles 206 in the liquid 208 have been substantially removed but the liquid 208 kept inside the fluid device. To this end, a pressure profile which indicates a pressure build up in the fluidic device 200 over time is monitored. The application of pressure by the one or more fluid control devices 400 is controlled by the feedback control 406 using the pressure value measured by the pressure sensor 404 as an input.

Figure 4:
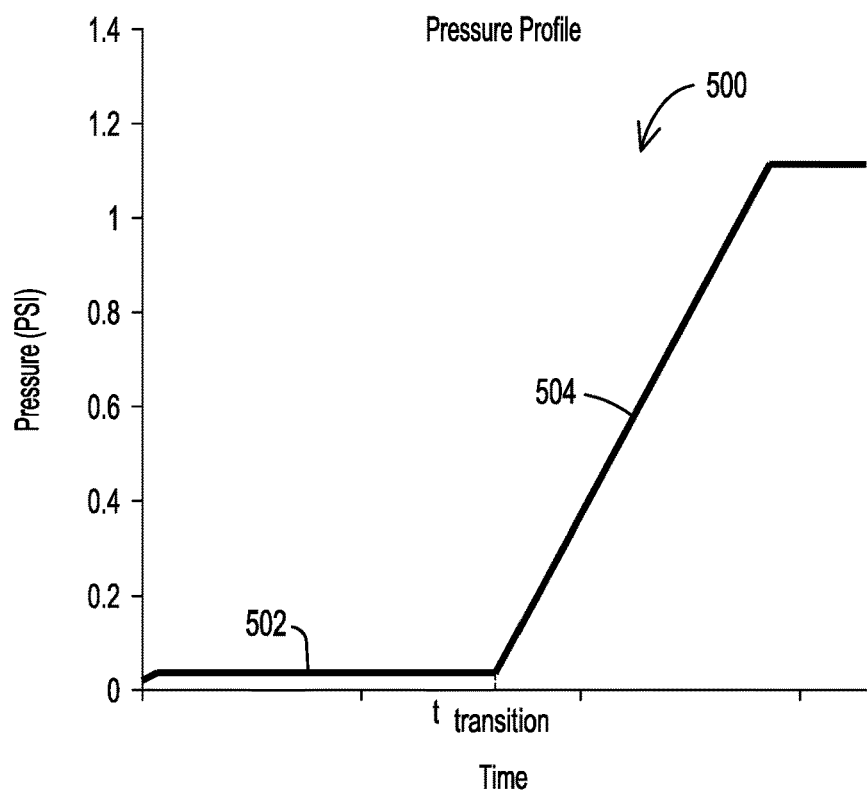
FIG. 4 is a graphical illustration of a pressure profile inside a fluidic device according to an exemplary embodiment of the present invention.

FIG. 4 graphically illustrates an example of a pressure profile 500 inside a fluidic device 200. The pressure profile 500 is a plot of the measured pressure in the fluidic device 200 versus time.

An exemplary method for degassing a fluidic device 200 of FIG. 1 with the aid of a fluid control device 400 will now be described in conjunction with FIG. 4.

During an operation of the fluidic device 200, a liquid 208 is transported through the fluidic device 200 by a fluid control device 400. Gas 206 (or bubbles) may be formed in the fluidic device 200 of the fluid system. Gas 206 formed in the fluidic device 200 may interfere with an assay performance of the fluidic device 200 as well as fluid control of the fluid system 100. Thus it is beneficial to remove as much of the gas as possible.

According to an exemplary embodiment, the fluid control device 400 is activated to apply a pressure differential between the first side 302 and the second side 304 of the membrane 300 during filling and degassing. This pressure differential is precisely chosen such that it is high enough to allow gas 206 to escape through the membrane 300 while staying below an applicable threshold value which would cause the liquid 208 the fluidic device 200 to flow out through the pores 306 of the membrane 300 as well. Thus at pressure differentials below the threshold value, the membrane 300 is permeable to the gas 206 and is impermeable to the liquid 208. Gas 206 in the fluidic device 200 is therefore removed through the membrane 300 under the applied pressure differential.

The degassing method may comprise applying a low pressure differential between the first side 302 and second side 304 of the membrane 300 by continuous pumping. For example and without limitations, the low pressure differential may be less than 0.2 psi, as illustrated in FIG. 4. This is indicated by a substantially flat portion 502 in the pressure profile 500. The applied pressure differential is high enough to pump the gas 206 through the pores 306 of the membrane 300, but is not high enough to expel the liquid 208 through the pores 306. When gas 206 has been substantially expelled through the pores 306, the pressure differential between the two sides 302, 304 of the membrane 300 begins to increase. This is indicated by a rising ramp 504 in the pressure profile 500. The point in time $t_{transition}$ where the pressure profile 500 changes from substantially flat 502 to a rising ramp 504 is identified as an end point of the degassing operation, indicating that the gas 206 trapped in the liquid 208 has been substantially removed. Beyond this point $t_{transition}$, named as a transition point, the fluid control device 400 may be deactivated, for example, to prevent the liquid 208 from being removed through the pores 306 of the membrane 300.

According to an exemplary embodiment, a pressure of the liquid 208 in the fluidic device 200 may be measured by a pressure sensor 404 disposed along the fluidic device 200. A pressure profile 500 which indicates the pressure in the fluidic device 200 over time is thus monitored. The feedback control 406 operates the pump 408 based on the monitored pressure profile 500. For example, the feedback control 406 may activates the pump 400 for a time period for degassing gas 206 through the membrane 300 whereby the pressure profile 500 is in a substantially flat portion 502. The feedback control 406 may deactivate the pump 400 when the pressure profile 500 is in a rising ramp 504 to prevent the liquid 208 from being removed through the pores 306 of the membrane 300.

The above illustrated method provides a simple and effective solution for degassing and removing gas (or bubbles) in fluidic devices by using a porous membrane, in particular, a hydrophobic membrane, where bubble-free sample, reagents or mixture are critical to metering, mixing, fluid control, reaction, and detection. Gas or bubbles penetrates the membrane at a low pressure while liquids require a higher pressure to penetrate the membrane.

According to an exemplary embodiment, a fluidic device disclosed enables degassing of large volume of gas or bubbles in a fluidic channel or a fluidic chamber at a high flow rate. The fluidic device disclosed uses a porous membrane to remove gas or bubbles in a fluidic channel or a fluidic chamber through the membrane under a proper pressure differential, as opposed to the state of the art which uses micro fabricated structures to trap the gas or bubbles in a fluidic channel or a fluidic chamber. The fluidic device disclosed is easy to implement, manufacture, and of low cost. The fluidic device disclosed includes a broad working pressure range which offers higher flexibility for implementation. Pressure range may be further increased by appropriate design of pore size, or by use of a hydrophobic membrane.

According to an exemplary embodiment, the porous membrane may work as a deflector when used in the optical measurement chamber. The disclosed method provides a bubble-free filling with an aid of the pressure feedback which may facilitate a high precision sample metering in a fluidic channel or chamber, as opposed to the state of the art which uses transmissive or reflective optical sensor. A high precision sample metering may be achieved using the disclosed method in miniature devices, such as microfluidics and lab-on-a-chip devices.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The following is a list of non-limiting illustrative embodiments of the inventive concepts discloses herein:

1. A fluid system comprising: a fluidic device; a fluid control device connected to the fluidic device for controlling a flow of liquid in the fluidic device; and a membrane disposed at a degassing area of the fluidic device for removing gas contained in the liquid, wherein the membrane comprises a plurality of pores, wherein the membrane comprises two sides with one side facing the liquid, wherein the fluid control device is configured to generate a positive pressure differential between the two sides of the membrane when activated, and wherein the membrane is permeable to the gas contained in the fluidic device and is impermeable to the liquid in the fluidic device under the pressure differential.

2. The fluid system of illustrative embodiment 1, wherein the fluid control device comprises a pressure sensor for measuring a pressure in the fluidic device for monitoring a pressure profile indicating the pressure in the fluidic device over time.

3. The fluid system of illustrative embodiment 2, wherein the fluid control device comprises a feedback control for controlling the pressure based on the monitored pressure profile.

4. The fluid system of illustrative embodiment, wherein the fluid control device comprises at least one pump connected to the fluidic device.

5. The fluid system of illustrative embodiment 4, wherein the feedback control comprises a controller configured to activate the pump for a time period whereby the pressure profile exhibits a substantially constant pressure in the fluidic device, and to deactivate the pump when the pressure profile exhibits an increase in pressure in the fluidic device.

6. The fluid system of illustrative embodiment 4, wherein the at least one pump is configured to apply a positive pressure to the one side of the membrane facing the liquid.

7. The fluid system of illustrative embodiment 4, wherein the at least one pump is configured to apply a negative pressure to another side of the membrane not facing the liquid.

8. The fluid system of illustrative embodiment 4, wherein the at least one pump is disposed external to the fluidic device.

9. The fluid system of illustrative embodiment 4, wherein the at least one pump comprises a syringe pump.

10. The fluid system of illustrative embodiment 1, wherein the fluidic device comprises at least one fluidic chamber and at least one fluidic channel connected to the fluidic chamber.

11. The fluid system of illustrative embodiment 10, wherein the membrane is disposed over the at least one fluidic chamber.

12. The fluid system of illustrative embodiment 10, wherein the at least one fluidic chamber comprises a reaction chamber.

13. The fluid system of illustrative embodiment 10, wherein the at least one fluidic chamber comprises an optical measurement chamber.

14. The fluid system of illustrative embodiment 10, wherein the at least one fluidic channel is a closed channel.

15. The fluid system of illustrative embodiment 1, wherein a plurality of porous membranes are disposed at a plurality of degassing areas.

16. The fluid system of illustrative embodiment 15, wherein the plurality of porous membranes have different pore sizes.

17. The fluid system of illustrative embodiment 1, wherein the membrane comprises a hydrophobic material.

18. The fluid system of illustrative embodiment 1, wherein the fluidic device is a microfluidic device.

19. The fluid system of illustrative embodiment 1, wherein the fluidic device is embodied on a biochip.

20. The fluid system as claimed in claim 1, wherein the liquid comprises a reagent, a sample, or a mixture of the reagent and the sample.

21. An illustrative method for degassing a fluidic device with a fluid control device comprising: disposing a membrane at a degassing area of the fluidic device for removing gas contained in the fluidic device, wherein the membrane comprises two sides with one side facing a liquid in the fluidic device, and wherein the membrane comprises a plurality of pores, generating a positive pressure differential between the two sides of the membrane when activating the fluid control device, wherein the membrane is permeable to the gas contained in the fluidic device and is impermeable to the liquid in the fluidic device under the pressure differential; and applying said pressure differential to the membrane till the gas contained in the fluidic device are substantially removed from the fluidic device.

22. The method of illustrative embodiment 21, further comprising measuring a pressure in the fluidic device by a pressure sensor for monitoring a pressure profile indicating the pressure in the fluidic device over time.

23. The method of illustrative embodiment 22, further comprising controlling the pressure based on the monitored pressure profile by a feedback control.

24. The method of illustrative embodiment 23, wherein the feedback control activates the fluid control device for a time period whereby the pressure profile exhibits a substantially constant pressure in the fluidic device, and deactivating the fluid control device when the pressure profile exhibits an increase in pressure in the fluidic device.

25. The method of illustrative embodiment 21, wherein a positive pressure is applied to the one side of the membrane facing the liquid.

26. The method of illustrative embodiment 21, wherein a negative pressure is applied to another side of the membrane not facing the liquid.

The invention claimed is:

1. A fluid system comprising:
   a fluidic device;
   a fluid control device connected to the fluidic device for controlling a flow of liquid in the fluidic device, the fluid control device comprising
      a pressure sensor for measuring a pressure in the fluidic device for monitoring a pressure profile indicating the pressure in the fluidic device over time,
      at least one pump connected to the fluidic device, and
      a feedback control for controlling the pressure based on the monitored pressure profile by selectively activating the pump; and
   a plurality of membranes disposed at a plurality of degassing areas of the fluidic device for removing gas contained in the liquid,
   wherein each of the plurality of membranes comprises a plurality of pores having different pore sizes,
   wherein each of the plurality of membranes comprises two sides with one side facing the liquid,
   wherein the fluid control device is configured to generate a positive pressure differential between the two sides of each of the plurality of membranes when activated, and
   wherein each of the plurality of membranes are permeable to the gas contained in the fluidic device and is impermeable to the liquid in the fluidic device under the pressure differential.

2. The fluid system as claimed in claim 1, wherein the feedback control comprises a controller configured to activate the pump for a time period whereby the pressure profile exhibits a substantially constant pressure in the fluidic device, and to deactivate the pump when the pressure profile exhibits an increase in pressure in the fluidic device.

3. The fluid system as claimed in claim 1, wherein the fluidic device comprises at least one fluidic chamber and at least one fluidic channel connected to the fluidic chamber.

4. The fluid system as claimed in claim 1, wherein the plurality of membranes are disposed over a plurality of fluidic chambers.

5. The fluid system as claimed in claim 1, wherein the plurality of membranes comprise a hydrophobic material.

6. The fluid system as claimed in claim 1, wherein the fluidic device is a microfluidic device.

7. The fluid system as claimed in claim 1, wherein the liquid comprises a reagent, a sample, or a mixture of the reagent and the sample.

8. A method for degassing a fluidic device with a fluid control device comprising:
   disposing a plurality of membranes at a plurality of degassing areas of the fluidic device for removing gas contained in the fluidic device, wherein each of the plurality of membranes comprises two sides with one side facing a liquid in the fluidic device, and wherein each of the plurality of membranes comprises a plurality of pores having different pore sizes,
   generating a positive pressure differential between the two sides of each of the plurality of membranes by activating the fluid control device, wherein each of the plurality of membranes is permeable to the gas contained in the fluidic device and is impermeable to the liquid in the fluidic device under the pressure differential;
   applying said pressure differential to each of the plurality of membranes until the gas contained in the fluidic device are substantially removed from the fluidic device; and
   measuring a pressure in the fluidic device by a pressure sensor for monitoring a pressure profile indicating the pressure in the fluidic device over time.

9. The method as claimed in claim 8, wherein the feedback control activates the fluid control device for a time period whereby the pressure profile exhibits a substantially constant pressure in the fluidic device, and deactivating the fluid control device when the pressure profile exhibits an increase in pressure in the fluidic device.

* * * * *